Oct. 28, 1924.

E. O. SCHWEITZER 1,513,013

MEANS FOR MEASURING APPROXIMATE MAXIMUM DEMANDS

Filed Dec. 6, 1918     4 Sheets-Sheet 1

Inventor
Edmund O. Schweitzer
By Brown, Hanson & Borton
Attorneys

Oct. 28, 1924.  
E. O. SCHWEITZER  
1,513,013  
MEANS FOR MEASURING APPROXIMATE MAXIMUM DEMANDS  
Filed Dec. 6, 1918  
4 Sheets-Sheet 2

Inventor  
Edmund O. Schweitzer  
By Brown Hanson & Boettcher  
Attorneys

Oct. 28, 1924.                                                    1,513,013
              E. O. SCHWEITZER
     MEANS FOR MEASURING APPROXIMATE MAXIMUM DEMANDS
           Filed Dec. 6, 1918      4 Sheets-Sheet 3
Fig. 6
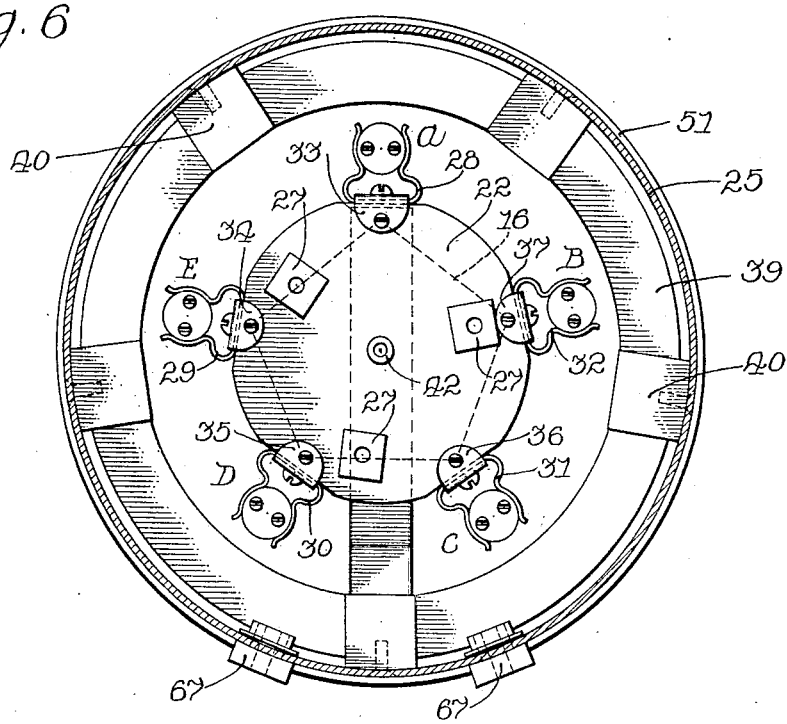
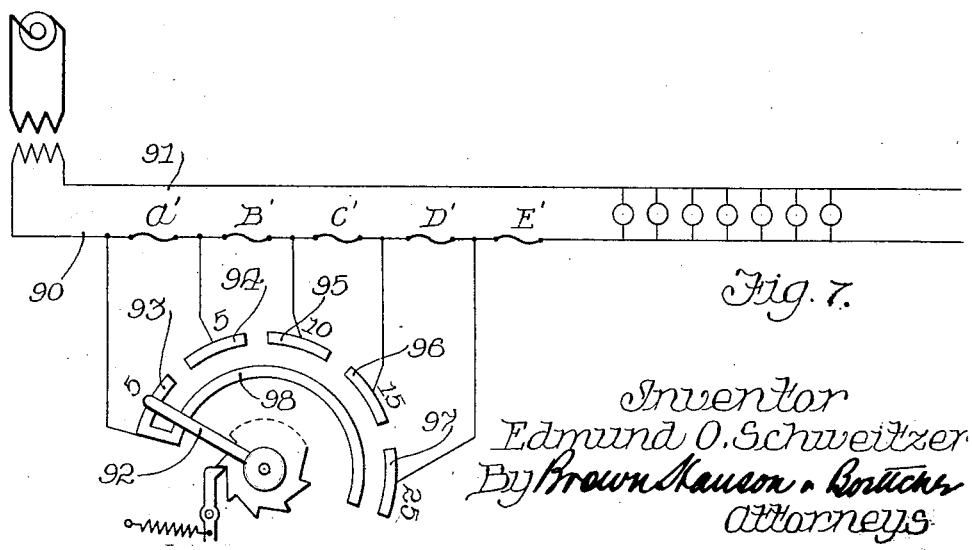
Fig. 7.
Inventor
Edmund O. Schweitzer
By Brown, Jackson & Boettcher
            Attorneys Oct. 28, 1924.

E. O. SCHWEITZER 1,513,013

MEANS FOR MEASURING APPROXIMATE MAXIMUM DEMANDS

Filed Dec. 6, 1918   4 Sheets-Sheet 4

Inventor
Edmund O. Schweitzer
By Brown Hanson Boettcher
Attorneys.

Patented Oct. 28, 1924.

1,513,013

UNITED STATES PATENT OFFICE.

EDMUND O. SCHWEITZER, OF CHICAGO, ILLINOIS.

MEANS FOR MEASURING APPROXIMATE MAXIMUM DEMANDS.

Application filed December 6, 1918. Serial No. 265,488.

*To all whom it may concern:*

Be it known that I, EDMUND O. SCHWEITZER, a citizen of the United States, residing at Chicago, in the county of Cook and State of Illinois, have invented a certain new and useful Improvement in Means for Measuring Approximate Maximum Demands, of which the following is a full, clear, concise, and exact description, reference being had to the accompanying drawings, forming a part of this specification.

My invention is particularly designed to provide means for measuring the approximate maximum demand of small consumers of electrical energy, such as resident consumers, but it is to be understood that the invention is not to be limited to such use.

In selling electrical power to consumers, the central station is interested in not only the amount of power which the consumer or customer contracts to use, but is interested in the rate at which this power will be used.

The cost of the service to the customer must depend in some degree upon the manner in which power is demanded, and the central station or operating company is interested in knowing under what conditions the consumer draws current and whether his maximum demand exceeds the amount agreed upon in fixing the rate of payment for power. If he regularly oversteps the predetermined demand, he is charged more for power even though the total amount used is not any greater, either by a system of penalties or through an increased rate of charge for power.

The consumer is also much interested in knowing when, how often, and to what extent he passes the amount contracted for, as he may be and generally is willing to limit his maximum demand (in order to prevent overstepping the predetermined amount of current) when he has notice that he is about to or has passed the predetermined maximum. The central station generally makes no objection to an overdraft of current if it is of only momentary duration, but is interested in the amount of each overdraft if it continues for any appreciable length of time.

Heretofore the measurement of maximum demand has been accomplished only by the use of complicated and expensive mechanism which is out of the question for the small consumer. The aggregate of small customers is generally so large that it is highly desirable to measure the maximum demand and to give notice of any serious overdraft of current of each consumer to permit the consumer to limit his demand. With the apparatus heretofore available this has not been feasible.

My invention aims to provide an improved means for measuring the approximate maximum demand for electrical power which will be suitable for use in the case of small consumers, such as resident consumers.

According to my invention I provide a series of elements sensitive to current flow preferably but not necessarily fusible conductors, which I term fuses, of predetermined current carrying capacity. I arrange these fuses in a group of progressively larger capacities and cause the current to operate successively upon the fuses in accordance with their capacity. The largest capacity of fuse blown represents approximately the largest draft of current taken in each case.

I employ preferably a special type of fuse which has a substantially constant time element of relatively long extent so that the fuse will not be blown upon overdraft of very short time duration, and so that the operation of the fuse is a relatively accurate indication of the fact that a certain flow of current has been exceeded. By fuse having a substantially constant time element is meant a fuse that will always tend to carry the overload whether large or small for substantially the same time before blowing.

The particular means by which the invention is carried out may be varied. For instance, I may place the fuses of progressively increasing sizes in parallel and have a movable switch element for connecting these fuses in series relation in the circuit one at a time in the order of their size so that after a fuse for example, of 5 amperes size is blown, the switch element is movable to connect the fuse of the next larger size, for instance 10 amperes. Or I may put all the fuses in series in the conductor either in order of their capacity or otherwise, and when a fuse of lower capacity or size blows, I place a shunt around the terminals of the fuse of lower capacity which has just blown so that only fuses of higher capacity are left in the circuit.

I also provide indicating means in connection with the switching means for indicating the largest size of fuse blown, this indication being an approximate indication of the maximum demand. Instead of indicating the largest size of fuse blown, the indicating means may indicate the lowest size of fuse which has not been blown.

A further aim of my invention is the provision of improved means for controlling the proper setting of the switching means, particularly in the case of a manually operated device. Other objects of the invention will be apparent from the following detailed description of my invention.

My invention resides particularly in the method of checking or recording the maximum demand of small consumers and in the system of carrying out that method, and while I shall describe a preferred embodiment of the system it will be understood that I do not limit myself to the exact details thereof, nor to the exact arrangement of circuits shown.

In the accompanying drawings which form a part of the present specification, I have illustrated one embodiment of my invention.

Figure 6 is a transverse cross section taken one the line 6—6 of Figure 3;

Figure 7 is a diagram of a modification;

Figure 8:
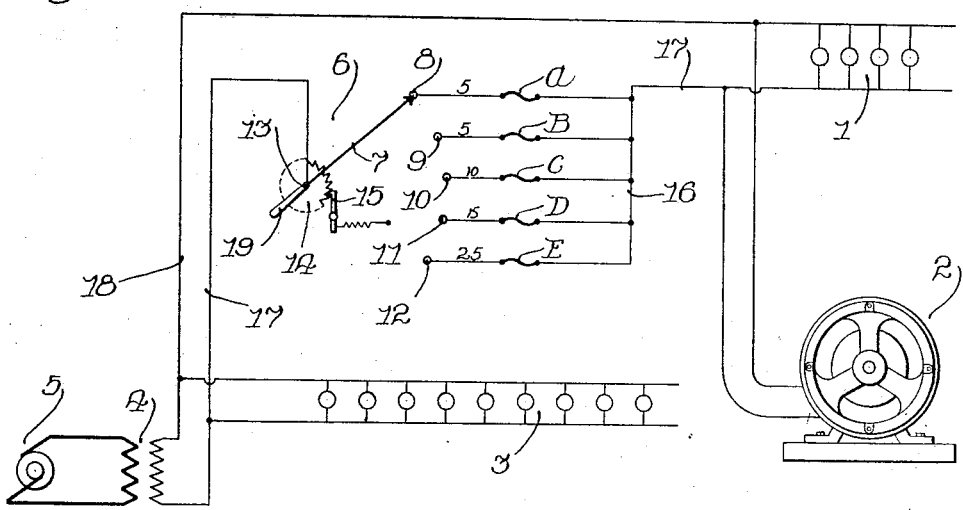
Figure 8 is a circuit diagram of the preferred form shown in Figures 1 to 6.

Referring first to Figure 8 I shall explain the general theory and purpose of my invention which I have embodied in the preferred form illustrated in Figures 1 to 6.

Assuming that on the customer's premises there are various current consuming devices such as the lamps, 1, the motor 2 and another group of lamps 3.

These power consuming devices are fed through a service transformer 4 supplied from a suitable source of power 5 which may be considered as the central station. In series with all or a part of the load, I provide a series of fuses A, B, C, D, and E, and a switching device 6 so constructed and arranged as to permit the fuses A, B, C, D, and E to be connected successively in series in the line. The fuses are arranged in the order of their carrying capacity with exception of the fuses A and B which are of the same capacity in this particular embodiment. The switch 6 comprises the movable element 7 which is pivoted on a suitable shaft and adapted to make electrical contact with the contacts 8, 9, 10, 11 and 12. The shaft 13, upon which the arm 7 is mounted, is provided with a ratchet 14 and a pawl 15 which prevents retrograde motion and which serves to center the wiping arm 7 in the proper position on the corresponding contact. The fuses are connected to the respective contact points at one terminal and the other terminal of each fuse is connected to a common wire 16 connected in series in the line 17. Assuming that the consumer is to be charged with current taken only by the lamps 1 and the motor 2, it will be understood that if the load connected to the mains 17—18 exceed the current carrying capacity of the fuse A, that this fuse will blow and interrupt the line, giving the consumer a warning that he has exceeded a demand equal to the current carrying capacity of the fuse. Assuming that the current carrying capacity of the fuse A is 5 amperes, if this fuse is blown, the consumer knows that he has drawn more than 5 amperes of current. As soon as the fuse blows there is an interruption to his service and he can again draw current only after moving the switch arm 7 to the next contact 9 or to the succeeding contact 10. In each case the blowing of the fuse indicates that a current in excess of the amount at which the fuse is rated has been drawn and roughly indicates the maximum demand. The maximum demand cannot rise much higher or cannot rise higher for any appreciable length of time than the capacity of the fuse, because the fuse will be blown and will interrupt the flow of current in a relatively short time. So that this device serves not only as a maximum demand indicating device but also serves as a maximum demand limiting means.

The bank of lamps 3 has been illustrated to indicate that not all of the consumer's current flow need be taken through this device so that no interruption of current flow would occur in the case of certain essential consumption devices.

I shall now describe in connection with Figures 1 to 6 the preferred manner of embodying the invention which is diagrammatically illustrated in Figure 8.

I provide a pair of discs of insulation 21 and 22 which are connected together by the posts or columns 23 of insulation or metal and this structure is secured to the back wall 24 of the case 25 by the three blocks or supporting posts 27. Upon the discs 21 and 22 I have mounted the spring fuse clips in pairs marked 28—29—30—31 and 32. These spring fuse clips are mounted on the periphery of the discs 21 and 22, and the front clips are provided with the contact members 8—9—10—11 and 12, respectively, which are adapted to be engaged by the movable switch arm 7 which is moved by the shaft 13. The rear spring clips are provided with terminal clips 33—34—35—36 and 37 respectively. These contact clips and terminal clips are L-shaped, having a short arm adapted to lie at the bottom of the respective fuse clips, which fuse clips are of a general U-shape and have the other arm of the L extending along the face of the corresponding disc. The terminal clips 33 to 37 inclusive are connected by a common connection shown in dotted lines at reference number 16 in Figure 6.

An annular or ring contact 39 is mounted on the inside of the circular case 25 on the insulating blocks 40. This annular contact 39 is adapted to be engaged by the arm 41 which forms an extension of the contact arm 7. The two arms 7 and 41 are made of one piece of spring metal, properly bent to shape and this spring contact piece is pivoted on the shaft 42 by means of the hub 43 which is made of insulating material in order to insulate the shafts 13 and 42. The hub 43 is provided with a pair of pins 45 which co-operate with a flange 44 fastened on the shaft 13. The parts 44 and 43, together with the pins 45, form a pair of co-operating clutch members for connecting the shaft 13 with the contact members 7—41. The shaft 13 is connected to the inner end of a flat spiral spring 46, the outer end of which is fastened to a post 47 which is in turn mounted on the front or cap 48 of the casing 25. The shaft 13 is also provided with a ratchet wheel 14 and pawl 15, the pawl being pivoted on the front 48. The outer end of the shaft 13 passes through the front 48 and has an indicator 49 and a knob 50 secured thereto lying upon the outside of the casing. The pointer 49 lies in line with the switch arm 7 and the front of the casing section 48 is provided with the indicating figures shown in Figure 1 for indicating the size of fuse which is in the circuit. It will be seen at once that the front or cover 48 of the casing 25 may be removed without disturbing the circuit connections because of the separability of the parts 44 and 43. The front or cover 48 is provided with a suitable flange 51 which may serve to secure the front upon the casing 25 in any preferred manner. If desired, a lock may be provided for preventing unauthorized access to the interior of the device. The operation is substantially as described in connection with Figure 8. If the current taken by the consumer exceeds the capacity of the fuse, the fuse will be blown and it will then be necessary to turn the handle or knob 50 in a clockwise direction.

Figure 1:
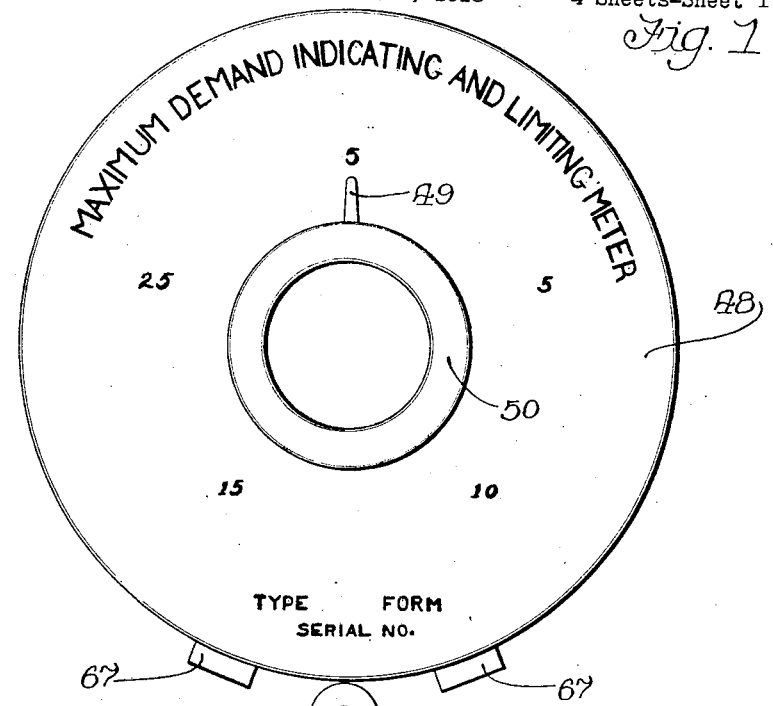
Figure 1 is a front elevational view.
Figure 2:
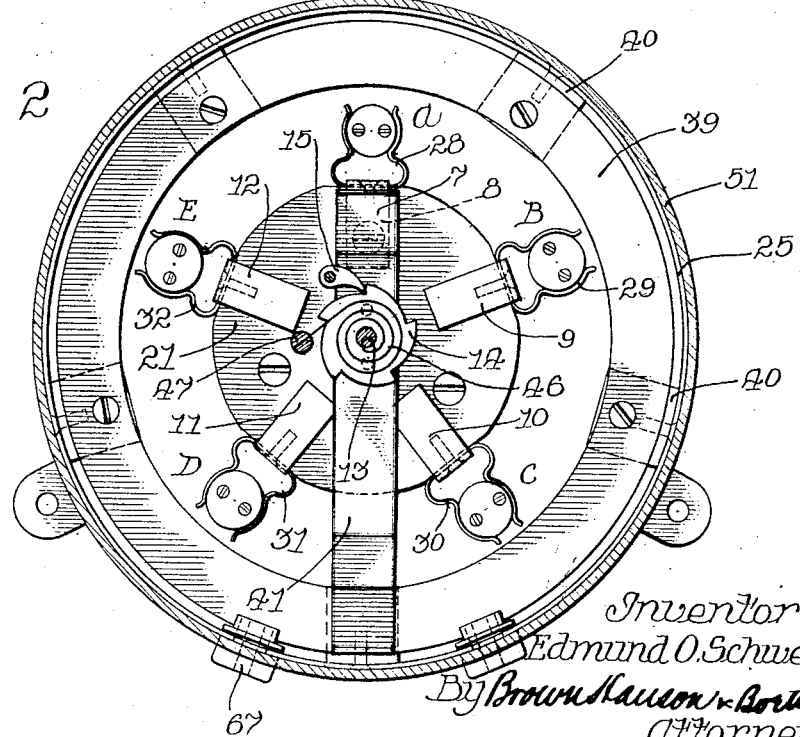
Figure 2 is a cross sectional view taken on the line 2—2 of Figure 3.
Figure 3:
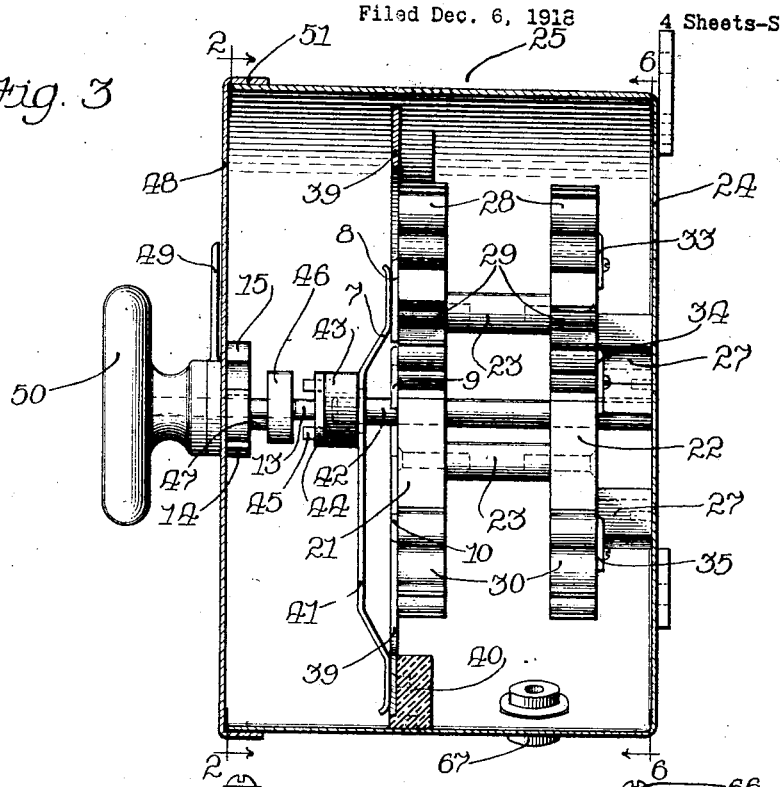
Figure 3 is a longitudinal cross section taken at right angles to the plane of the paper in Figure 1.
Figure 4:
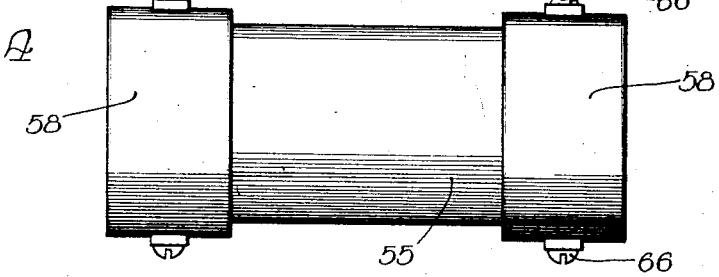
Figure 4 is a side elevation of the type of fuse employed in my invention.
Figure 5:
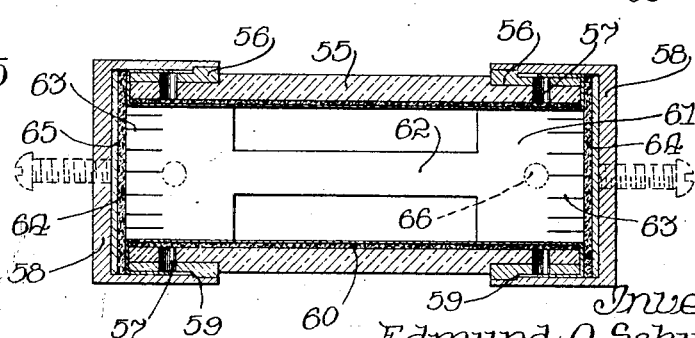
Figure 5 is a longitudinal cross section of the fuse shown in Figure 4.

The particular fuse shown in Figures 4 and 5 is of the type shown in my Patent 1,413,997, issued April 25, 1922, and is of the proper characteristics to be employed in this connection.

While any fuse could be used with a fair degree of success, I find that it is essential for accurate and satisfactory work to have a fuse having the characteristics of a fairly uniform time element, a uniform capacity and having a relatively large time element so that momentary or instantaneous rushes of current will not immediately blow the fuse. This fuse being particularly described and claimed in my copending application, above referred to, need not be specifically described herein. Suffice to say that it consists of a central sleeve of insulation 55 having rings or ferrules 56 attached to the ends thereof closely fitting over the sleeve of insulation, and being secured by pins 57. Metallic caps 58 fit over the ferrules 56 and the ferrules and caps are provided with shoulders as shown at 59 to limit the motion of these parts with respect to each other. A lining of asbestos 60 on the inner surface of the sleeve 55 is provided and a thin sheet metal fuse 61 is mounted on the inside of the lining of asbestos closely fitting against the same. This fuse is provided with portions which are cut away, leaving thin strips such as shown at 62 between the cylindrical ends. The cylindrical ends of the fuse members are slotted, as shown at 63, and these slotted ends which form fingers are bent over the open end of the sleeve 55 and the adjacent ferrule 56 and lie between the cap and the ferrules, where space for them is provided. The end of the fuse is covered by an asbestos washer or disc 64 and a metallic disc 65 lies between said asbestos disc and the inner end of the cap. The cap is provided with suitable screw holes so that screws may be inserted for forcing of the cap off of the ferrules, as indicated at dotted lines at Figure 5. The fusible element may consist of a number of strips 62 and may be wound several times around the inner periphery of the sleeve 55. This fusible element is made of zinc. In operation the fuse gives a slight but well defined time limit between the first occurrence of the overload and the blowing of the fuse, and the fuse is further characterized by prompt extinguishment of the arc, with marked lack of any destructive heating or arcing, when the fusible element becomes fused. The caps 58 are held on by means of the screws 66. The fuse provides a completely enclosed fluid tight shell.

The casing is provided with insulating bushings 67 through which the main circuit wires are introduced into the main casing 25, as shown in Figures 1, 2, 3 and 6.

The pawl and ratchet 14—15 prevent turning of the switch arm 7 in the reverse direction and serve the further useful function of causing the switch arm to align itself squarely with the corresponding contact. For instance, if the switch arm 7 be turned slightly further than the contact 8, shown in dotted line in Figure 2, so that it would contact with the member 9, it is obvious that the two fuses would be connected in parallel, giving a false condition. To prevent this, the spring is provided in connection with the pawl and ratchet to bring the arm back to the proper position where the pawl 15 engages the corresponding tooth of the ratchet. This is an important improvement in apparatus of this class.

It is not absolutely essential to connect the fuses in series one at a time in the main. The fuses may be connected in series with each other in the line as shown in Figure 7. It will be obvious that the fuse of smallest capacity will be blown first and so on, in succession. As shown in Figure 7 the fuses A'—B'—C'—D' and E' are connected in series in the mains 90—91 with a switching device similar to that shown in Figures 1 to 6 inclusive arranged to cut out the various fuses after they are blown so that only fuses of higher capacity will remain in the circuit. This is accomplished by means of a switching arm 92 and a series of contacts 93 to 97 inclusive. A common contact 98 connected on the lineside of all of the fuses is adapted to shunt out, in order, the fuses which have been blown, in accordance with their capacity. This manner of connecting the fuses may be practiced in the form of device shown in Figures 1 to 6 inclusive by connecting the fuses in series instead of in parallel.

The consumer is usually anxious to keep the maximum demand as low as possible, and to this end it is desirable that the circuit remain open until he shall have had an opportunity for reducing the demand, and hence the form shown in Figures 1 to 6, and Figure 8 is preferable for the ordinary resident consumer's installation.

As explained in connection with Figure 8 the load need not all be taken through the maximum demand meter.

The connection of the fuses in series simplifies the wiring to some extent, and the combined series resistance of the fuses is so small as to be unobjectionable. It will be obvious that in its broader aspect, my invention is not limited to the particular way in which the fuses are connected, or to the exact construction of the switch; the preferred form of the invention as brought out in Figures 1 to 6, and in Figure 7, being readily capable of modification without departing from spirit and scope of the invention as claimed.

I do not intend to be limited to the details shown and described.

I claim:

1. In combination, a pair of discs of insulation, means for supporting said discs in spaced relation with respect to each other, an enclosing casing, means for supporting said discs from one wall of the casing, a plurality of contacts arranged in a circular group on the other disc, a circular common contact, a switch arm mounted concentrically of the common annular contact and of said group of contacts, fuses mounted peripherally about said discs and connected to said contacts, a block of insulating material secured to said switch, a shaft guiding the block of insulating material, an operating shaft for the switch arm coupled to said block, a cover for the casing, said operating shaft extending to said cover, manual means outside of the casing for operating said shaft.

2. In combination, a pair of discs of insulation, means for supporting said discs in spaced relation with respect to each other, an enclosing casing, means for supporting said discs from one wall of the casing, a plurality of contacts arranged in a circular group on the other disc, a circular common contact, a switch arm mounted concentrically of the common annular contact and of said group of contacts, fuses mounted peripherally about said discs and connected to said contacts, a block of insulating material secured to said switch, a shaft guiding the block of insulating material, an operating shaft for the switch arm coupled to said block, a cover for the casing, said operating shaft extending to said cover, manual means outside of the casing for operating said shaft, and indicating means for indicating the position of the switching arm with respect to the stationary switch contact.

3. In combination, a pair of discs of insulation, means for supporting said discs in spaced relation with respect to each other, an enclosing casing, means for supporting said discs from one wall of the casing, a plurality of contacts arranged in a circular group on the other disc, a circular common contact, a switch arm mounted concentrically of the common annular contact and of said group of contacts, fuses mounted peripherally about said discs and connected to said contacts, a block of insulating material secured to said switch, a shaft guiding the block of insulating material, an operating shaft for the switch arm coupled to said block, a cover for the casing, said operating shaft extending to said cover, manual means outside of the casing for operating said shaft, a ratchet wheel secured to said operating shaft, a pawl mounted on the cover, a spring connected to the operating shaft and tending to move the ratchet against the pawl, the teeth of said ratchet being spaced in angular alignment with the position of the stationary switch contact.

4. In combination, a pair of discs of insulating material, means for supporting said discs in spaced relation with respect to each other, fuse clips mounted on the peripheries of said discs, fuses supported in said clips, stationary switch contacts for said fuses arranged in circular group on one of the supporting discs, said contacts being connected to corresponding terminals of the fuses, a common annular contact on the other supporting disc, a pivoted switch arm for connecting each of said first contacts with said common annular contact in turn, a casing enclosing said discs, fuses, contacts and switch arm, a cover for the casing, an operating shaft for the switch arm extending through the cover, and indicating means on said shaft cooperating with legends on the cover for indicating the particular fuse in circuit.

In witness whereof, I hereunto subscribe my name this 18th day of October, A. D. 1918.

EDMUND O. SCHWEITZER.